(12) United States Patent
Lee et al.

(10) Patent No.: US 11,339,827 B2
(45) Date of Patent: May 24, 2022

(54) LOAD-VARIABLE ROLLING BEARING AND ROLLING ELEMENT FOR THE SAME

(71) Applicants: Young Keun Lee, Yongin-si (KR); Hyun Yui Sin, Seoul (KR)

(72) Inventors: Young Keun Lee, Yongin-si (KR); Hyun Yui Sin, Seoul (KR)

( * ) Notice: Subject to any disclaimer, the term of this patent is extended or adjusted under 35 U.S.C. 154(b) by 0 days.

(21) Appl. No.: 17/163,567

(22) Filed: Feb. 1, 2021

(65) Prior Publication Data

US 2021/0239158 A1 Aug. 5, 2021

(30) Foreign Application Priority Data

Feb. 3, 2020 (KR) .......................... 10-2020-0012398

(51) Int. Cl.
| | |
|---|---|
| *F16C 19/36* | (2006.01) |
| *F16C 19/16* | (2006.01) |
| *F16C 19/50* | (2006.01) |
| *F16C 33/32* | (2006.01) |
| *F16C 33/36* | (2006.01) |
| *F16C 19/52* | (2006.01) |

(52) U.S. Cl.
CPC .......... *F16C 19/361* (2013.01); *F16C 19/166* (2013.01); *F16C 19/50* (2013.01); *F16C 19/522* (2013.01); *F16C 33/32* (2013.01); *F16C 33/36* (2013.01)

(58) Field of Classification Search
CPC ...... F16C 19/16; F16C 19/166; F16C 19/361; F16C 19/50; F16C 19/522; F16C 25/08; F16C 33/32; F16C 33/36; F16C 33/585
See application file for complete search history.

(56) References Cited

U.S. PATENT DOCUMENTS

| | | | | |
|---|---|---|---|---|
| 438,576 | A * | 10/1890 | Elliott | .................... F16C 33/36 384/568 |
| 621,376 | A * | 3/1899 | Seubert | ................... F16C 19/40 384/522 |
| 1,469,991 | A * | 10/1923 | Armstrong | .............. F16C 33/36 384/564 |

(Continued)

FOREIGN PATENT DOCUMENTS

| | | | |
|---|---|---|---|
| CN | 203962681 U | 11/2014 | |
| DE | 102012207067 A1 * | 10/2013 | ............. F16C 19/48 |
| JP | 2001173662 A * | 6/2001 | ............. F16C 33/36 |

(Continued)

*Primary Examiner* — Alan B Waits
(74) *Attorney, Agent, or Firm* — Revolution IP, PLLC (57) ABSTRACT

A load-variable rolling bearing includes: an outer ring having an outer ring raceway surface with spherical surface contact portions having concave arch sections and a variable contact portion having a shape of a cylinder in such a manner as to be adjacent to the spherical surface contact portions in an axial direction of the spherical surface contact portions; an inner ring having an inner ring raceway surface with spherical surface contact portions having concave arch sections and a variable contact portion having a shape of a cylinder in such a manner as to be adjacent to the spherical surface contact portions in an axial direction of the spherical surface contact portions; and a plurality of rolling elements each having a cylindrical variable contact portion and spherical surface portions formed with convex spherical surfaces on both sides of the variable contact portion.

8 Claims, 4 Drawing Sheets

(56) References Cited

U.S. PATENT DOCUMENTS

| | | | | |
|---|---|---|---|---|
| 6,431,986 B2 * | 8/2002 | Olszewski | ............ | F16D 3/2055 |
| | | | | 384/564 |
| 2005/0238272 A1 * | 10/2005 | Teramachi | ............ | F16C 19/362 |
| | | | | 384/491 |

FOREIGN PATENT DOCUMENTS

| | | | | | |
|---|---|---|---|---|---|
| JP | 2002005175 A | * | 1/2002 | ............ | F16C 29/065 |
| JP | 2009-074600 A | | 4/2009 | | |
| KR | 10-0691889 B1 | | 3/2007 | | |
| KR | 10-2009-0041103 A | | 4/2009 | | |
| WO | WO-0120183 A1 | * | 3/2001 | .............. | F16C 19/26 |

* cited by examiner

LOAD-VARIABLE ROLLING BEARING AND ROLLING ELEMENT FOR THE SAME

CROSS REFERENCE TO RELATED APPLICATION OF THE INVENTION

The present application claims the benefit of Korean Patent Application No. 10-2020-0012398 filed in the Korean Intellectual Property Office on 2020 Feb. 3, the entire contents of which are incorporated herein by reference.

BACKGROUND OF THE INVENTION

Field of the Invention

The present invention relates to a load-variable rolling bearing and rolling elements for the same, and more particularly, to a load-variable rolling bearing that is capable of having a variable rated capacity according to an external force applied thereto and to rolling elements for the same.

Background of the Related Art

A ball bearing is a bearing which operates with balls as rolling elements located between an inner ring and an outer ring, and generally, a retainer (referred to as cage) for maintaining circumferential gaps among the balls as the rolling elements is mounted on the ball bearing.

Figure 1:
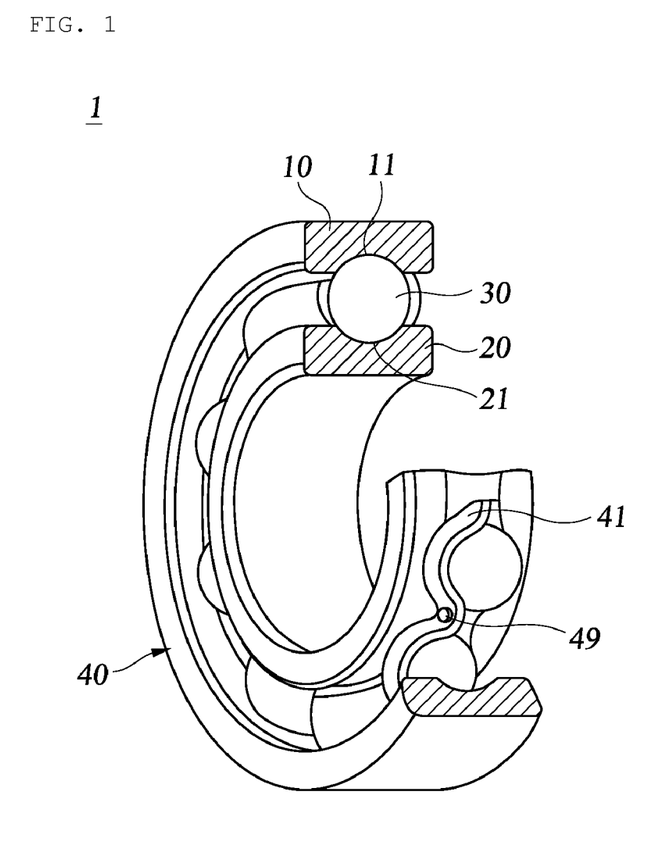
FIG. 1 is a partially cutaway perspective view showing a conventional ball bearing.

FIG. 1 is a partially cutaway perspective view showing a conventional ball bearing 1. Referring to FIG. 1, the conventional ball bearing 1 includes an outer ring 10 having an outer ring raceway surface 11 formed along an inner peripheral surface thereof in such a manner as to come into contact with balls 30 as rolling elements, an inner ring 20 having an inner ring raceway surface 21 formed along an outer peripheral surface thereof in such a manner as to come into contact with the balls 30, and the balls 30 electrically moving between the outer ring raceway surface 11 of the outer ring 10 and the inner ring raceway surface 21 of the inner ring 20, and a retainer 40 located between the outer ring 10 and the inner ring 20 to maintain circumferential gaps of the balls 30.

A rated capacity (static rated load and dynamic rated load) as support capability of the rolling bearing like the ball bearing against a load applied from the outside is varied according to the number of rolling elements and the sizes (diameters of balls, and diameters of rollers in the case of a roller bearing) of the rolling elements.

The ball bearing as shown in FIG. 1 has spherical balls as rolling elements, and when compared with a roller bearing like a tapered roller bearing as disclosed in Korean Patent Application Laid-open No. 10-2009-0041103, the ball bearing has smaller contact areas with the rolling elements to produce low contact resistance, thereby advantageously decreasing a rotating torque. However, the support capability of the ball bearing against the load applied thereto becomes weaker than that of the roller bearing.

Accordingly, the tapered roller bearing as disclosed in Korean Patent Application Laid-open No. 10-2009-0041103 is applied to a conventional transmission for a vehicle. Recently, high fuel efficiency is required for the vehicle, and a ball bearing with a low rotating torque is used to avoid environmental problems like global warming. If the load applied to the bearing as well as the transmission is varied, the bearing has to be designed to consider large load application, and accordingly, a relatively large size bearing may be unnecessarily provided when compared with the operating size thereof.

For example, the load applied to the bearing is large at low stages (e.g., stages 2 and 3) of the transmission, and the load applied to the bearing is extremely small at high stages (more than stage 5) of the transmission. An operating rate of the bearing at the low stages is less than 10%, and the bearing generally operates with an operating rate of more than 90% at the high stages. The operating rate of the bearing disposed in the transmission is less than 10%, but since the bearing has to be designed correspondingly to the low stages where a large load is applied thereto, the bearing having an unnecessarily large rated capacity is used at the high stages wherein the bearing operates at the operating rate of more than 90%. Further, the weight of the bearing or the rotating torque of the bearing causes serious troubles while being used at the high stages of the transmission.

For another example, a single or double row four-point contact ball bearing is widely applied to a blade bearing (or pitch bearing) of a wind turbine generator. However, a truncation problem frequently occurs on balls and raceway surfaces due to extreme loads generated from momentary wind gusts whose usage rate is very low, thereby causing bearing failures. So as to solve the problem, diameters of the balls are substantially enlarged to increase the rated capacity of the bearing. As a result, undesirably, the bearing is unnecessarily increased in size so as to satisfy the extreme loads with the usage rate of less than 5%.

SUMMARY OF THE INVENTION

Accordingly, the present invention has been made in view of the above-mentioned problems occurring in the related art, and it is an object of the present invention to provide a load-variable rolling bearing that is capable of having a variable rated capacity according to an external force applied thereto under a load-variable environment and to provide rolling elements for the same.

To accomplish the above-mentioned objects, according to the present invention, there is provided a load-variable rolling bearing including: an outer ring having an outer ring raceway surface concavely formed along an inner peripheral surface thereof, the outer ring raceway surface having spherical surface contact portions having concave arch sections and a variable contact portion having a shape of a cylinder in such a manner as to be adjacent to the spherical surface contact portions in an axial direction of the spherical surface contact portions; an inner ring having an inner ring raceway surface concavely formed along an outer peripheral surface thereof, the inner ring raceway surface having spherical surface contact portions having concave arch sections and a variable contact portion having a shape of a cylinder in such a manner as to be adjacent to the spherical surface contact portions in an axial direction of the spherical surface contact portions; and a plurality of rolling elements arranged between the outer ring raceway surface and the inner ring raceway surface in a circumferential direction thereof, each rolling element having a cylindrical variable contact portion and spherical surface portions formed with convex spherical surfaces on both sides of the variable contact portion, wherein the spherical surface portions of the rolling element is located between the spherical surface contact portions of the outer ring raceway surface and the spherical surface contact portions of the inner ring raceway surface, and the variable contact portion of the rolling element is located between the variable contact portion of the outer ring raceway surface and the variable contact portion of the inner ring raceway surface.

According to the present invention, desirably, the two spherical surface contact portions of the outer ring raceway surface are formed spaced apart from each other in the axial direction, the two spherical surface contact portions of the inner ring raceway surface are formed spaced apart from each other in the axial direction, the variable contact portion of the outer ring raceway surface is located between the spherical surface contact portions of the outer ring raceway surface, the variable contact portion of the inner ring raceway surface is located between the spherical surface contact portions of the inner ring raceway surface in such a manner as to be spaced apart from the variable contact portion of the outer ring raceway surface in an inward radial direction, and the spherical surface contact portions of the inner ring raceway surface face the spherical surface contact portions of the outer ring raceway surface in diagonal directions.

According to the present invention, desirably, before the variable contact portion of the rolling element comes into contact with the variable contact portion of the outer ring raceway surface and the variable contact portion of the inner ring raceway surface on both sides thereof, at the time of coupling the bearing, the spherical surface portions of the rolling element come into contact with the spherical surface contact portions of the outer ring raceway surface and the spherical surface contact portions of the inner ring raceway surface on both sides thereof.

According to the present invention, desirably, if the coupling of the bearing is finished, the spherical surface portions of the rolling element come into contact with the spherical surface contact portions of the outer ring raceway surface and the spherical surface contact portions of the inner ring raceway surface on both sides thereof, and the variable contact portion of the rolling element is spaced apart from the variable contact portion of the outer ring raceway surface and the variable contact portion of the inner ring raceway surface on both sides thereof.

According to the present invention, desirably, the variable contact portion of the outer ring raceway surface and the variable contact portion of the inner ring raceway surface have the shape of a crown protruding at an axial center portion thereof. According to the present invention, desirably, the variable contact portion of the rolling element has the shape of a crown protruding from a longitudinal center portion thereof.

According to the present invention, desirably, the outer ring includes undercut portions formed concavely between the spherical surface contact portions and the variable contact portion of the outer ring raceway surface in such a manner as to be extended in the circumferential direction, and the inner ring includes undercut portions formed concavely between the spherical surface contact portions and the variable contact portion of the inner ring raceway surface in such a manner as to be extended in the circumferential direction.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE EMBODIMENTS

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

In the description, the terms "having," "including," "containing" and similar referents in the specification and in the following claims are to be construed as open-ended terms (e.g., meaning "including, but not limited to,") unless otherwise noted.

The use of the terms "a" and "an" in the specification and in the following claims are to be construed to cover both the singular and the plural, unless otherwise indicated herein or clearly contradicted by context.

When it is said that one element is described as being "connected" or "coupled" to the other element, one element may be directly connected or coupled to the other element, but it should be understood that another element may be present between the two elements.

In the drawing, a single row bearing as a rolling bearing is shown, but it is just exemplary. Accordingly, a double row bearing may be also provided as the rolling bearing.

Now, an explanation of a load-variable rolling bearing and rolling elements for the rolling bearing according to the present invention will be given with reference to the attached drawings.

Figure 2:
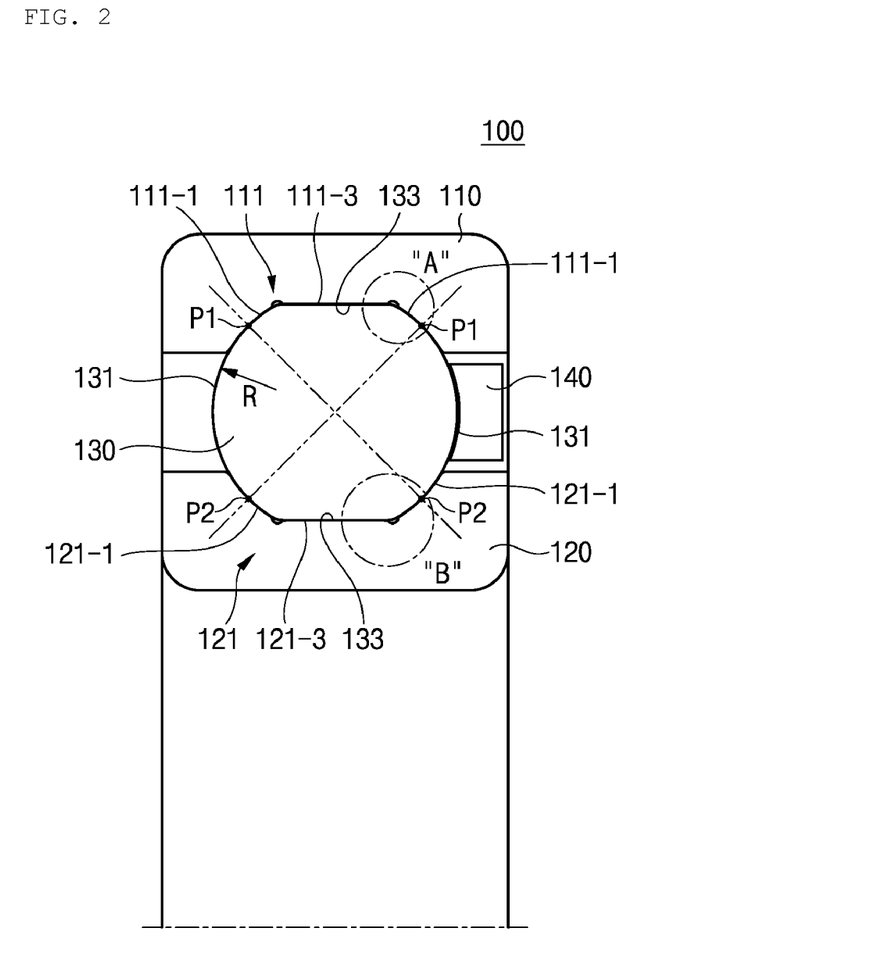
FIG. 2 is a half sectional view showing a load-variable rolling bearing according to the present invention.
Figure 3:
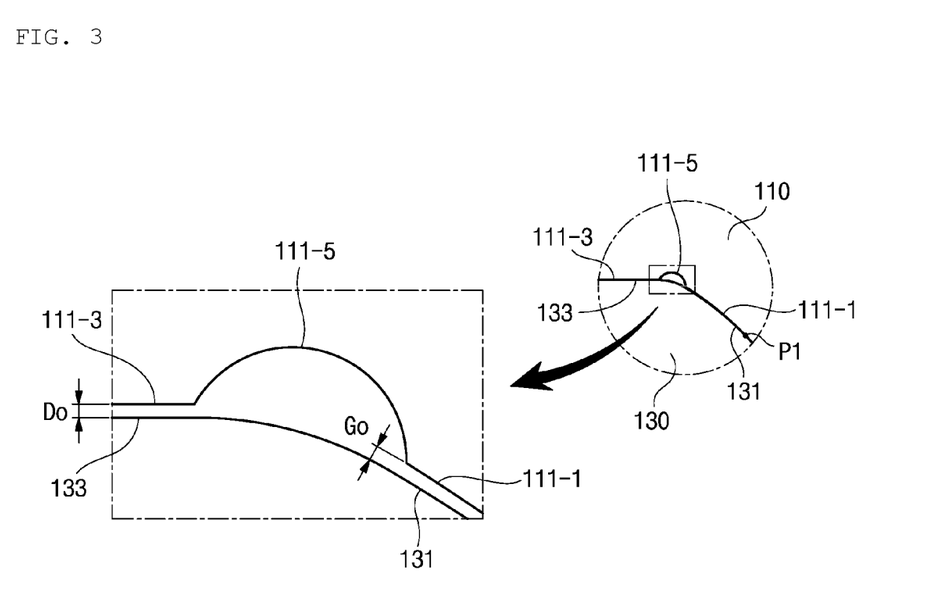
FIG. 3 is an enlarged view showing a portion "A" of FIG. 2.
Figure 4:
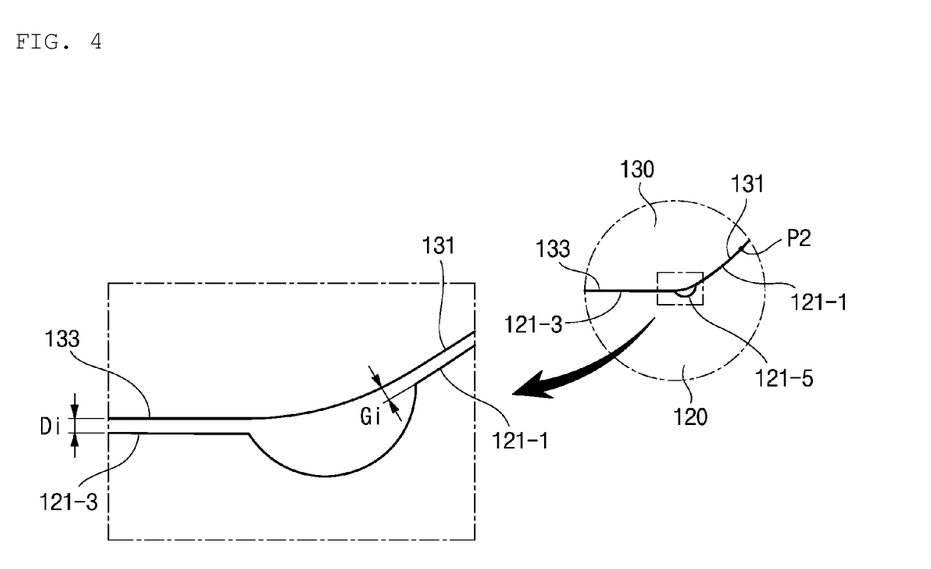
FIG. 4 is an enlarged view showing a portion "B" of FIG. 2.
Figure 5:
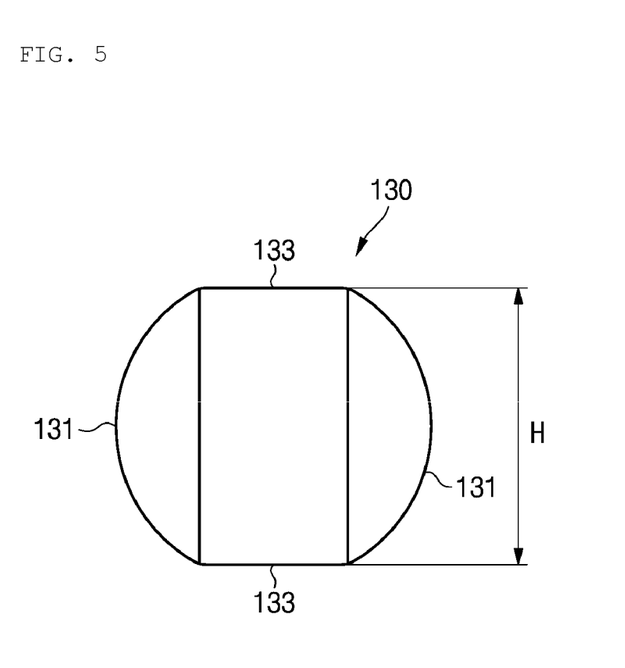
FIG. 5 is a sectional view showing a rolling element provided on the load-variable rolling bearing according to the present invention.

FIG. 2 is a half sectional view showing a load-variable rolling bearing according to the present invention, FIG. 3 is an enlarged view showing a portion "A" of FIG. 2, FIG. 4 is an enlarged view showing a portion "B" of FIG. 2, and FIG. 5 is a sectional view showing a rolling element provided on the load-variable rolling bearing according to the present invention.

In the description as will be discussed below, a horizontal direction of FIG. 2 is defined as an axial direction, and a vertical direction of FIG. 2 is as a radial direction.

As shown in FIG. 2, a load-variable rolling bearing 100 according to the present invention includes an outer ring 110 having an outer ring raceway surface 111 concavely formed along an inner peripheral surface thereof, an inner ring 120 having an inner ring raceway surface 121 concavely formed along an outer peripheral surface thereof, and a plurality of rolling elements 130 arranged between the outer ring raceway surface 111 and the inner ring raceway surface 121 in a circumferential direction. A reference numeral 140 indicates a cage for maintaining circumferential gaps between the rolling elements 130. The load-variable rolling bearing 100 according to the present invention further includes the cage 140. The cage is ring-shaped and has a plurality of pockets spaced apart from each other in the circumferential direction to accommodate the rolling elements 130 therein.

Even if not shown in FIG. 2, seals are provided on open portions formed on both axial sides between the inner ring 120 and the outer ring 110.

Each rolling element 130 includes a cylindrical variable contact portion 133 and spherical surface portions 131 formed with convex spherical surfaces on both longitudinal sides of the variable contact portion 133.

As shown in FIG. 5, each rolling element 130 has the shape of a cylinder formed by removing some portions from a sphere. A diameter H of the variable contact portion 133 is formed in a range of 80 to 95% of a value (2×R) obtained by multiplying a radius of curvature of the spherical surface portion 131 by 2. As the spherical surface portions 131 are formed on the rolling element 130, the number of rolling elements 130 coupled to the bearing becomes larger (for example, by one or two rolling elements) than the number of spherical rolling elements.

The variable contact portion 133 has the shape of the cylinder to have an outwardly protruding crown. A specific shape of the crown is well known in the conventional technology, and accordingly, an explanation of the shape of the crown will be avoided.

The rolling element 130 is made to the shape of a sphere whose roundness is less than 3 μm, and while both side peripheries of the sphere are chucked and rotated, the center portions of the sphere are ground to form the cylindrical variable contact portion 133. Otherwise, the sphere may pass through a space between a rubber grinding wheel (for rotating) and a grinding wheel (for grinding) to form the cylindrical variable contact portion 133.

The outer ring raceway surface 111 includes spherical surface contact portions 111-1 and a variable contact portion 111-3. The spherical surface contact portions 111-1 are extended in the circumferential direction and have concave arch-like sectional shapes, as shown in FIG. 2.

The variable contact portion 111-3 is adjacent in the axial direction to the spherical surface contact portions 111-1 to form a concave bottom of the outer ring raceway surface 111. The two spherical surface contact portions 111-1 are formed spaced apart from each other in the axial direction, and the variable contact portion 111-3 is located between the spherical surface contact portions 111-1 to form the bottom of the outer ring raceway surface 111.

The variable contact portion 111-3 of the outer ring raceway surface 111 is formed cylindrically. The variable contact portion 111-3 is formed to a shape of a convex crown. As the variable contact portion 111-3 has the shape of the crown, a center portion of the variable contact portion 111-3 first comes into contact with the variable contact portion 133 of the rolling element 130 when an external force is applied to the rolling bearing to cause the variable contact portion 111-3 to come into contact with the variable contact portion 133 of the rolling element 130, thereby preventing collection of contact stress.

A radius of curvature of the arch section of each spherical surface contact portion 111-1 as shown in FIG. 2 is larger than the radius R of curvature of each spherical surface portion 131 of the rolling element 130. The radius of curvature of each spherical surface contact portion 111-1 is formed in the range of 102 to 200% of the radius of curvature of each spherical surface portion 131 of the rolling element 130.

If the bearing is coupled to a shaft and a housing (not shown), that is, if the inner ring or the outer ring is press-fitted to the shaft or housing, as shown in FIG. 2, the center points of the arches of the spherical surface contact portions 111-1 of the outer ring raceway surface 111 come into contact with the spherical surface portions 131 of the rolling element 130 (in this case, the contacts occur on reference symbols P1 of FIG. 2). The spherical surface contact portions 111-1 of the outer ring raceway surface 111 come into contact with the spherical surface portions 131 of the rolling element 130, on both axial sides thereof, while placing the variable contact portion 111-3 therebetween.

The spherical surface contact portions 111-1 come into contact with the spherical surface portions 131 of the rolling element 130, on both axial sides thereof, and the variable contact portion 111-3, which is located between the spherical surface contact portions 111-1, is spaced apart from the variable contact portion 133 of the rolling element 130 by a minute distance Do (for example, 100 μm).

The radius of curvature of each spherical surface contact portion 111-1 of the outer ring raceway surface 111 is larger than that of each spherical surface portion 131 of the rolling element 130, and accordingly, a gap between the spherical surface contact portion 111-1 and the spherical surface portion 131 becomes increased on their both sides.

Further, outer ring undercut portions 111-5 are formed concavely between the spherical surface contact portions 111-1 and the variable contact portion 111-3 of the outer ring raceway surface 111 in such a manner as to be extended in the circumferential direction. Through the formation of the outer ring undercut portions 111-5, interference with the rolling elements 130 can be prevented and superfinishing for the spherical surface contact portions 111-1 and the variable contact portion 111-3 of the outer ring raceway surface 111 can be gently performed.

A reference symbol Go as shown in FIG. 3 indicates a gap between each spherical surface contact portion 111-1 of the outer ring raceway surface 111 and each spherical surface portion 131 of the rolling element 130. If the parts of the bearing are coupled to one another, the spherical surface contact portions 111-1 of the outer ring raceway surface 111 and the spherical surface portions 131 of the rolling element 130 come into contact with each other on the center points P1 of the arches of the spherical surface contact portions 111-1 in the axial direction, and as they are distant from the center points, their gap Go becomes increased.

The inner ring raceway surface 121 includes spherical surface contact portions 121-1 and a variable contact portion 121-3. The spherical surface contact portions 121-1 are extended in the circumferential direction and have concave arch-like sectional shapes, as shown in FIG. 2.

The variable contact portion 121-3 is adjacent in the axial direction to the spherical surface contact portions 121-1 to form a concave bottom of the inner ring raceway surface 121. The two spherical surface contact portions 121-1 are formed spaced apart from each other in the axial direction, and the variable contact portion 121-3 is located between the spherical surface contact portions 121-1 to form the bottom of the inner ring raceway surface 121.

The variable contact portion 121-3 of the inner ring raceway surface 121 faces the variable contact portion 111-3 of the outer ring raceway surface 111 in such a manner as to be spaced apart from the variable contact portion 111-3 in an inward radial direction.

The spherical surface contact portions 121-1 of the inner ring raceway surface 121 face the spherical surface contact portions 111-1 of the outer ring raceway surface 111 in diagonal directions.

The variable contact portion 121-3 of the inner ring raceway surface 121 is formed cylindrically. The variable contact portion 121-3 is formed to a shape of a convex crown. As the variable contact portion 121-3 has the shape of the crown, a center portion of the variable contact portion 121-3 first comes into contact with the variable contact portion 133 of the rolling element 130, thereby preventing collection of contact stress.

A radius of curvature of the arch section of each spherical surface contact portion 121-1 as shown in FIG. 2 is larger than the radius R of curvature of each spherical surface portion 131 of the rolling element 130. The radius of curvature of each spherical surface contact portion 121-1 is formed in the range of 102 to 200% of the radius of curvature of each spherical surface portion 131 of the rolling element 130. If the bearing is coupled to the shaft and the housing, as shown in FIG. 2, the spherical surface contact portions 121-1 of the inner ring raceway surface 121 come into contact with the spherical surface portions 131 of the rolling element 130 at the center points of the arches of the spherical surface contact portions 121-1 (in this case, the contacts occur on reference symbols P2 of FIG. 2). The spherical surface contact portions 121-1 of the inner ring raceway surface 121 come into contact with the spherical surface portions 131 of the rolling element 130, on both axial sides thereof, while placing the variable contact portion 121-3 therebetween.

The spherical surface contact portions 121-1 of the inner ring raceway surface 121 come into contact with the spherical surface portions 131 of the rolling element 130, on both axial sides thereof, and the variable contact portion 121-3 of the inner ring raceway surface 121, which is located between the spherical surface contact portions 121-1, is spaced apart from the variable contact portion 133 of the rolling element 130 by a minute distance Di (for example, 100 µm). A gap between each spherical surface contact portion 121-1 of the inner ring raceway surface 121 and each spherical surface portion 131 of the rolling element 130 becomes large on their both sides.

Further, inner ring undercut portions 121-5 are formed concavely between the spherical surface contact portions 121-1 and the variable contact portion 121-3 of the inner ring raceway surface 121 in such a manner as to be extended in the circumferential direction. Through the formation of the inner ring undercut portions 121-5, interference with the rolling elements 130 can be prevented and superfinishing for the spherical surface contact portions 121-1 and the variable contact portion 121-3 of the inner ring raceway surface 121 can be gently performed.

A reference symbol Gi as shown in FIG. 4 indicates a gap between each spherical surface contact portion 121-1 of the inner ring raceway surface 121 and each spherical surface portion 131 of the rolling element 130. If the parts of the bearing are coupled to one another, the spherical surface contact portions 121-1 of the inner ring raceway surface 121 and the spherical surface portions 131 of the rolling element 130 come into contact with each other on the center points P2 of the arches of the spherical surface contact portions 121-1, and as they are distant from the center points, their gap Gi becomes increased.

If a load is applied to the bearing, while the bearing is operating, for example, if a radial load is applied to a shaft (not shown) inserted into the inner ring 120, some of the rolling elements 130 are pressurized toward the outer ring 110 to allow the gaps Di between the variable contact portion 111-3 of the outer ring raceway surface 111 and the variable contact portion 133 of the rolling element 130 and the gaps Do between the variable contact portion 121-3 of the inner ring raceway surface 121 and the variable contact portion 133 of the rolling element 130 to be decreased. As the load is increased, the variable contact portion 111-3 of the outer ring raceway surface 111 and the variable contact portion 133 of the rolling element 130 come into contact with each other, and the variable contact portion 121-3 of the inner ring raceway surface 121 and the variable contact portion 133 of the rolling element 130 come into contact with each other.

If large load is applied to the bearing, the spherical surface contact portions 121-1 of the inner ring raceway surface 121 come into contact with the spherical surface portions 131 of the rolling element 130, and further, the variable contact portion 121-3 of the inner ring raceway surface 121 comes into contact with the variable contact portion 133 of the rolling element 130, thereby operating the inner ring 120. Also, the spherical surface contact portions 111-1 of the outer ring raceway surface 111 come into contact with the spherical surface portions 131 of the rolling element 130, and further, the variable contact portion 111-3 of the outer ring raceway surface 111 comes into contact with the variable contact portion 133 of the rolling element 130, thereby operating the outer ring 110. As a result, a rated load of the bearing can be increased.

At a high stage in which a large load is not applied to the bearing in a transmission, for example, the inner ring 120 rotates in a state where the spherical surface contact portions 121-1 of the inner ring raceway surface 121 come into contact with the spherical surface portions 131 of the rolling element 130, while the variable contact portion 121-3 of the inner ring raceway surface 121 does not come into contact with the variable contact portion 133 of the rolling element 130, and the outer ring 110 rotates in a state where the spherical surface contact portions 111-1 of the outer ring raceway surface 111 come into contact with the spherical surface portions 131 of the rolling element 130, while the variable contact portion 111-3 of the outer ring raceway surface 111 does not come into contact with the variable contact portion 133 of the rolling element 130, so that the inner ring 120 and the outer ring 110 rotate with four-point contacts (P1 and P2).

At a low stage in which a large load is applied to the bearing, the inner ring 120 rotates in a state where the variable contact portion 121-3 of the inner ring raceway surface 121 comes into contact with the variable contact portion 133 of the rolling element 130 and the spherical surface contact portions 121-1 of the inner ring raceway surface 121 come into contact with the spherical surface portions 131 of the rolling element 130, and the outer ring 110 rotates in a state where the variable contact portion 111-3 of the outer ring raceway surface 111 comes into contact with the variable contact portion 133 of the rolling element 130 and the spherical surface contact portions 111-1 of the outer ring raceway surface 111 come into contact with the spherical surface portions 131 of the rolling element 130. If a large load is applied like the low stage operation of the transmission, accordingly, the load support capability can be improved, and if a small load is applied like the high stage operation of the transmission, the rotation with the four-point contacts is carried out, so that a rotating torque becomes more reduced when compared with the rotation through the contact with the radial inner and outer sides of the variable contact portion 133 of the rolling element 130, thereby preventing unnecessary torque increase or efficiency (fuel efficiency) reduction caused by the use of large size bearings. As the rated capacity for a large load under load-variable environments becomes increased, the bearing can support the large load, without any increase in size thereof (in the sizes of the rolling elements).

The gap Di between the variable contact portion 111-3 of the outer ring raceway surface 111 and the variable contact portion 133 of the rolling element 130 or the gap Do between the variable contact portion 121-3 of the inner ring raceway surface 121 and the variable contact portion 133 of the rolling element 130 is set according to the sizes of the variable loads applied to the bearing.

As described above, the load-variable rolling bearing and the rolling elements for the rolling bearing according to the present invention do not need to be provided unnecessarily to a large size, thereby suppressing the energy loss caused by the weight and rotating torque thereof.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A load-variable rolling bearing (100) comprising:
    an outer ring (110) having an outer ring raceway surface (111) concavely formed along an inner peripheral surface thereof, the outer ring raceway surface (111) having spherical surface contact portions (111-1) having concave arch sections and a variable contact portion (111-3) having a shape of a cylinder in such a manner as to be adjacent to the spherical surface contact portions (111-1) in an axial direction of the spherical surface contact portions (111-1);
    an inner ring (120) having an inner ring raceway surface (121) concavely formed along an outer peripheral surface thereof, the inner ring raceway surface (121) having spherical surface contact portions (121-1) having concave arch sections and a variable contact portion (121-3) having a shape of a cylinder in such a manner as to be adjacent to the spherical surface contact portions (121-1) in an axial direction of the spherical surface contact portions (121-1); and
    a plurality of rolling elements (130) arranged between the outer ring raceway surface (111) and the inner ring raceway surface (121) in a circumferential direction thereof, each rolling element (130) having a cylindrical variable contact portion (133) and spherical surface portions (131) formed with convex spherical surfaces on both sides of the variable contact portion (133),
    wherein the spherical surface portions (131) of the rolling element (130) are located between the spherical surface contact portions (111-1) of the outer ring raceway surface (111) and the spherical surface contact portions (121-1) of the inner ring raceway surface (121), and the variable contact portion (133) of the rolling element (130) is located between the variable contact portion (111-3) of the outer ring raceway surface (111) and the variable contact portion (121-3) of the inner ring raceway surface (121).

2. The load-variable rolling bearing according to claim 1, wherein the two spherical surface contact portions (111-1) of the outer ring raceway surface (111) are formed spaced apart from each other in the axial direction, the two spherical surface contact portions (121-1) of the inner ring raceway surface (121) are formed spaced apart from each other in the axial direction, the variable contact portion (111-3) of the outer ring raceway surface (111) is located between the spherical surface contact portions (111-1) of the outer ring raceway surface (111), the variable contact portion (121-3) of the inner ring raceway surface (121) is located between the spherical surface contact portions (121-1) of the inner ring raceway surface (121) in such a manner as to be spaced apart from the variable contact portion (111-3) of the outer ring raceway surface (111) in an inward radial direction, and the spherical surface contact portions (121-1) of the inner ring raceway surface (121) face the spherical surface contact portions (111-1) of the outer ring raceway surface (111) in diagonal directions.

3. The load-variable rolling bearing according to claim 1, wherein before the variable contact portion (133) of the rolling element (130) comes into contact with the variable contact portion (111-3) of the outer ring raceway surface (111) and the variable contact portion (121-3) of the inner ring raceway surface (121) on both sides thereof, at the time of coupling the bearing, the spherical surface portions (131) of the rolling element (130) come into contact with the spherical surface contact portions (111-1) of the outer ring raceway surface (111) and the spherical surface contact portions (121-1) of the inner ring raceway surface (121) on both sides thereof.

4. The load-variable rolling bearing according to claim 1, wherein if the coupling of the bearing is finished, the spherical surface portions (131) of the rolling element (130) come into contact with the spherical surface contact portions (111-1) of the outer ring raceway surface (111) and the spherical surface contact portions (121-1) of the inner ring raceway surface (121) on both sides thereof, and the variable contact portion (133) of the rolling element (130) is spaced apart from the variable contact portion (111-3) of the outer ring raceway surface (111) and the variable contact portion (121-3) of the inner ring raceway surface (121) on both sides thereof.

5. The load-variable rolling bearing according to claim 1, wherein the variable contact portion (111-3) of the outer ring raceway surface (111) and the variable contact portion (121-3) of the inner ring raceway surface (121) have the shape of a crown protruding at an axial center portion thereof.

6. The load-variable rolling bearing according to claim 1, wherein the variable contact portion (133) of the rolling element (130) has the shape of a crown protruding from a longitudinal center portion thereof.

7. The load-variable rolling bearing according to claim 1, wherein the outer ring (110) comprises undercut portions (111-5) formed concavely between the spherical surface contact portions (111-1) and the variable contact portion (111-3) of the outer ring raceway surface (111) in such a manner as to be extended in the circumferential direction, and the inner ring (120) comprises undercut portions (121-5) formed concavely between the spherical surface contact portions (121-1) and the variable contact portion (121-3) of the inner ring raceway surface (121) in such a manner as to be extended in the circumferential direction.

8. Rolling elements (130) for a rolling bearing, each rolling element (130) comprising: a cylindrical variable contact portion (133) and spherical surface portions (131) formed with convex spherical surfaces on both sides of the variable contact portion (133), each rolling element (130) made to the shape of a sphere whose roundness is less than 3 µm in such a manner as to form the cylindrical variable contact portion (133).

* * * * *